Figure 1:
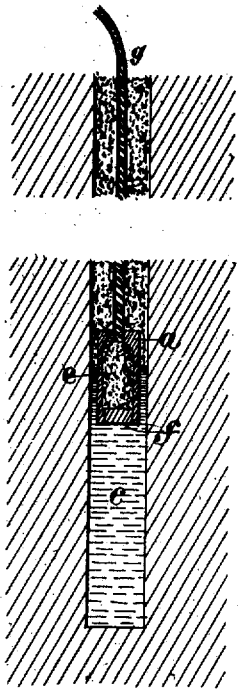

A. NOBEL.

Methods of Exploding Nitroglycerine.

No. 5,798. Reissued March 17, 1874.

WITNESSES

S. M. Pool

F. W. Ritter Jr

INVENTOR

Alfred Nobel

Assignee

The Atlantic Giant Powder Company

By Edw. Wright Attorney.

THE NORRIS PETERS CO., PHOTO-LITHO., WASHINGTON, D. C.

UNITED STATES PATENT OFFICE.

ALFRED NOBEL, OF HAMBURG, GERMANY, ASSIGNOR, BY MESNE ASSIGNMENTS, TO THE ATLANTIC GIANT-POWDER COMPANY, OF SAN FRANCISCO, CALIFORNIA.

IMPROVEMENT IN METHODS OF EXPLODING NITRO-GLYCERINE.

Specification forming part of Letters Patent No. 50,617, dated October 24, 1865; reissue No. 3,377, dated April 13, 1869; reissue No. 4,815, dated March 19, 1872; reissue No. 5,621, dated October 21, 1873; reissue No. 5,798, dated March 17, 1874; application filed March 11, 1874.

*To all whom it may concern:*

Be it known that ALFRED NOBEL, of the city of Hamburg, in the Empire of Germany, has invented certain new and useful Modes of Effecting the Explosion of Nitro-Glycerine; and that the following is a full, clear, and exact description thereof.

Prior to the date of NOBEL'S invention nitro-glycerine was known as an explosive substance, but had not been applied to technical purposes, in consequence of practical difficulties in procuring its explosion. This substance is characterized by the property that fire may be appled to it without effecting explosion. If ignited in an open space, it is slowly decomposed and takes fire, but the flame is apt to die out when the match is withdrawn; hence it cannot, under ordinary circumstances, be looked upon as a ready explosive agent, for, while gunpowder and other substances used as explosives prior to NOBEL'S invention always explode or deflagrate throughout the whole mass when fire is set to them, nitro-glycerine will not explode from the mere contact of flame; and that, while the firing of a cap explodes gunpowder, it does so by means of the flame produced, while in the case of nitro-glycerine it is the detonation, and not the flame, which produces the explosion; so, also, if a drop of nitro-glycerine be poured on an anvil, the blow of a hammer causes it to explode, but only that part is involved which has received the blow; so, also, in this case the explosion is merely a local one.

A principal object of NOBEL'S invention consists in the removal of this obstacle to the use of nitro-glycerine as an explosive. For this end two different methods were invented by NOBEL for promoting the explosion of nitro-glycerine; one method, which forms the subject of a separate specification, relates to the combination, with nitro-glycerine, of other more easily explosive substances; and the other method, which is the subject of this patent, relates to the means of effecting the explosion without such combination. This is accomplished by the application of heat, or heat and pressure, or by an initial explosion, which involves the whole mass in explosive decomposition, or by creating an impulse of explosion by means of concussive agitation, the means employed being in such relation to the mass of nitro-glycerine to be exploded as that the latter shall be within the influence of such initial explosion, or impulse of explosion. Pressure, developed by heat to the point of explosion of the charge is made use of in one instance, and in the other the detonation of some violently-exploding substance in presence of the charge of nitro-glycerine. Nitro-glycerine being liquid, if in such condition that it cannot escape from the influence of the initial explosion—as, for instance, when placed in a bore-hole for blasting, or otherwise confined — receives and propagates the initial pressure through its whole mass, and the first impulse of explosion is communicated throughout the whole charge, effecting its instantaneous decomposition and explosion. By the term impulse of explosion is meant motion produced to effect the explosion by suddenly communicated force. There are many ways of obtaining this impulse of explosion, such as—

First, by placing nitro-glycerine to be exploded in a tube or case of any suitable material which will hold it, and surrounding this tube with gunpowder, gun-cotton, or any readily-exploding substance, which, being easily fired by any of the well-known means, will instantaneously cause the explosion of the nitro-glycerine in the tube; or, by reversing this process, and pouring the nitro glycerine into the bore-hole for blasting, and inserting into the nitro-glycerine a tube charged with gunpowder, or gun-cotton, or other easily-exploding substance, when, by firing the charge in the tube, the nitro-glycerine also is exploded. When used for the purpose of blasting, the nitro-glycerine may be poured directly into the bore-hole, which may be closed above, for which purpose loose sand will do, or the upper part of the bore may be left entirely open. If not convenient to pour the nitro-glycerine directly into the bore-hole, it may be placed in cases of paper, or metal, or other suitable material, open or closed at top, as may be preferred.

Second, by the use of what NOBEL calls "igniters" or "burners," being a small tube of glass, paper, or other material, filled or charged with gunpowder or other easy explosive, and furnished with a fuse or other means of igniting the same by fire, or by an electric spark. The burner may be introduced into the nitro-glycerine, and, being fired in any convenient manner, its explosion gives to the nitro-glycerine the requisite impulse of explosion. These igniters may be greatly varied in construction, but in their simplest form they consist of a wooden cylinder, hollow inside, and filled with gunpowder, being corked at one end, and connected with a fuse at the other. When the nitro-glycerine has been poured into the bore or blast-hole, the cylinder is let down by its fuse until it swims in the nitro-glycerine, and then, if desired, the upper part of the bore is filled with loose sand, and nothing remains but to ignite the fuse. The fuse in its turn fires the explosive contained in the wooden cylinder, and the whole mass immediately explodes.

In the drawing, Figure 1 illustrates one of these igniters, in which *a* is the wooden cylinder; *e* the cavity, filled with gunpowder, and closed by the cork or plug *f*; and *g* the fuse. The nitro-glycerine in the bore-hole is represented at *c*.

Third. A third method is to heat a minute portion of the charge of nitro-glycerine to its point of explosion by inclosing a minute portion of nitro-glycerine in a tube filled either with rocket-powder, (which, being easily ignited, is fired in any convenient way,) or with lime and water, or some other chemical agents adapted to combine gradually, and, by their reaction, create the necessary heat. The explosion in the tube will give the requisite impulse to explode the charge of nitro-glycerine.

Fourth. Still another method is by means of a capsule, (more commonly termed in military art a percussion-cap,) which, being exploded in any convenient manner, gives by its detonation the requisite impulse to explode the charge of nitro-glycerine.

Figure 3:
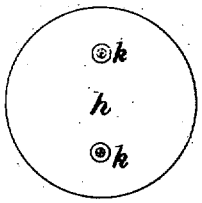
Figure 2:
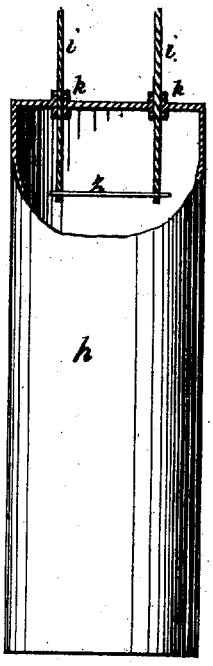

Fifth. A fifth mode is to produce an initial explosion by means of a spark, or by heat developed by a powerful current of electricity within the charge of nitro-glycerine, which is so inclosed as not to afford an escape to the gas developed thereby. Figs. 2 and 3 illustrate the apparatus for thus effecting the explosion. *h* is the case for holding the charge of nitro-glycerine, which is closed at top. *i i* are two wires, which pass through glass tubes *k k*, or other insulating substance, in the plug or cap of the case, the wires being immersed in the nitro-glycerine, and their lower ends connected by a fine platina wire, *z*. The wire *z* being heated by the passage of the electric current, the liquid in contact with the wire is decomposed, giving the heat and pressure requisite to explode the contents of the case.

Sixth. The necessary impulse of explosion may also be effected by means of an ordinary blasting-fuse. This will do in a closed space and under sufficient resistance; but, if the gases of the portion of nitro-glycerine decomposed by the heat of the fuse, are enabled to escape before they accumulate to such a pressure as to effect the requisite impulse of explosion, the nitro-glycerine is slowly decomposed and the fire generally goes out before the whole is consumed.

In view of the fact that nitro-glycerine had not, at the date of NOBEL's invention, been applied to any technical use as an explosive, and that, by his invention, he introduced this substance from the domain of science into that of practical use in the arts,

What we claim as the invention of ALFRED NOBEL, and desire to secure by Letters Patent, in the name of "THE ATLANTIC GIANT-POWDER COMPANY," as assignee of said NOBEL, is—

1. A charge of gunpowder, gun-cotton, or other easily igniting and exploding substance surrounding a tube or case containing the charge of nitro-glycerine, as a means of exploding the same, substantially as hereinbefore described.

2. A charge of gunpowder, gun-cotton, or other easily igniting and exploding substance surrounded by a nitro-glycerine charge, and combined therewith as a means of exploding the same, substantially as and for the purpose hereinbefore described.

3. A nitro-glycerine igniter or exploder consisting of a tube or case inclosing a minute portion of nitro-glycerine, together with lime and water, or other equivalent substances, which by combining will evolve the requisite heat to explode the nitro-glycerine therein, substantially as and for the purposes hereinbefore described.

4. An igniter or exploder consisting of a tube or case, containing rocket-powder mixed with a minute portion of nitro-glycerine, and furnished with a fuse or other means of setting fire to the igniting charge, substantially as hereinbefore described.

5. An electric spark or heat generated by electricity, within the charge of nitro-glycerine, as a means of promoting an impulse of explosion therein, substantially as hereinbefore described.

6. A capsule or percussion-cap furnished with a suitable means of firing or exploding the same, and suitably arranged in relation to the nitro-glycerine, so as by its detonation to explode the charge of nitro-glycerine, substantially as hereinbefore described.

7. An igniter for producing the explosion of nitro-glycerine, consisting of a case of wood or other suitable material for holding the initial explosion-charge, closed with a cork or plug, and a fuse or other means of ignition, substantially as hereinbefore described.

In witness whereof the said "THE ATLANTIC GIANT-POWDER COMPANY" has caused to be affixed hereunto the corporate seal of the said company and the signature of their president.

THE ATLANTIC GIANT-POWDER CO., [L. S.]
By GEO. C. HICKOX, *President.*

Witnesses:
H. PICHOIS,
JOURDAN W. ROPER.